United States Patent [19]
Harpell et al.

[11] Patent Number: 5,175,040
[45] Date of Patent: * Dec. 29, 1992

[54] FLEXIBLE MULTI-LAYERED ARMOR

[75] Inventors: Gary A. Harpell; Dusan C. Prevorsek, both of Morris Township, Morris County; Hsin L. Li, Parsippany, all of N.J.

[73] Assignee: Allied-Signal Inc., Morristown, N.J.

[*] Notice: The portion of the term of this patent subsequent to Sep. 4, 2007 has been disclaimed.

[21] Appl. No.: 701,337

[22] Filed: May 10, 1991

Related U.S. Application Data

[63] Continuation of Ser. No. 282,903, Dec. 12, 1988, abandoned, which is a continuation of Ser. No. 81,074, Aug. 3, 1987, abandoned.

[51] Int. Cl.⁵ .............................................. B32B 5/12
[52] U.S. Cl. ........................................ 428/113; 2/2.5; 428/213; 428/232; 428/246; 428/253; 428/286; 428/293; 428/294; 428/298; 428/302; 428/911
[58] Field of Search ............... 428/213, 232, 246, 252, 428/253, 260, 280, 289, 290, 911, 286, 293, 294, 298, 302, 113; 2/2.5

[56] References Cited

U.S. PATENT DOCUMENTS

| | | | |
|---|---|---|---|
| 4,079,161 | 3/1978 | Kile | 428/220 |
| 4,090,005 | 5/1978 | Morgan | 428/76 |
| 4,186,648 | 2/1980 | Clausen et al. | 428/240 |
| 4,198,707 | 4/1980 | Haupt et al. | 2/2.5 |
| 4,292,882 | 10/1981 | Clausen | 428/240 |
| 4,309,487 | 1/1982 | Holmes | 428/516 |
| 4,403,021 | 9/1983 | Harpell et al. | 428/290 |
| 4,457,985 | 7/1984 | Harpell et al. | 428/224 |
| 4,501,856 | 2/1985 | Harpell et al. | 525/240 |
| 4,543,286 | 9/1985 | Harpell et al. | 428/288 |
| 4,584,347 | 4/1986 | Harpell et al. | 525/119 |
| 4,613,535 | 9/1986 | Harpell et al. | 428/113 |
| 4,623,574 | 11/1986 | Harpell et al. | 428/113 |
| 4,650,710 | 3/1987 | Harpell et al. | 428/263 |
| 4,663,101 | 5/1987 | Kavesh et al. | 264/178 |
| 4,681,792 | 7/1987 | Harpell et al. | 428/102 |
| 4,737,401 | 4/1988 | Harpell et al. | 428/252 |
| 4,737,402 | 4/1988 | Harpell et al. | 428/252 |
| 4,820,568 | 4/1989 | Harpell et al. | 428/213 |
| 4,883,700 | 11/1989 | Harpell et al. | 428/113 |
| 4,953,234 | 9/1990 | Li et al. | 2/412 |

FOREIGN PATENT DOCUMENTS 2544481 10/1984 France ............................... 428/911

OTHER PUBLICATIONS

Ser. No. 808,681.
Ser. No. 825,039.
Ser. No. 766,727.
Ser. No. 81,260.
Ser. No. 81,075.
Ser. No. 81,073.

Primary Examiner—George F. Lesmes
Assistant Examiner—Christopher Brown

[57] ABSTRACT

The present invention is a flexible impact resistant article comprising a plurality of prepreg packets. Each prepreg packet comprises at least about 2 prepreg layers. Each prepreg layer comprises a plurality of coplanar fibers embedded in a polymeric matrix. There is a means to maintain at least a portion of each prepreg packet in successive layers. The prepreg packets are unattached to each other over a portion of their adjacent areas, preferably over a substantial portion of their adjacent areas. The plurality of packets results in improved flexibility.

14 Claims, 4 Drawing Sheets

FLEXIBLE MULTI-LAYERED ARMOR

This application is a continuation of application Ser. No. 282,903 filed Dec. 12, 1988, now abandoned which is a continuation of application of Ser. No. 081,074, filed on Aug. 3, 1987 (abandoned).

BACKGROUND OF THE INVENTION

The present invention is in the field of flexible impact resistant articles; particularly the invention relates to flexible ballistic resistant fibrous composite based articles.

Ballistic resistant articles such as bullet proof vests, curtains, mats, raincoats and umbrellas containing high strength fibers are known. Typically these articles are made of flexible fabrics. Fibers conventionally used include aramid fibers such as poly(phenylenediamine terephthalamide), nylon fibers, glass fibers and the like. For many applications, such as vests or parts of vests, the fibers are used in a woven or knitted fabric.

While the ballistic resistance of articles made using such fabrics have been satisfactory in commercial applications, improvements are always desirable. A particular area for improvement relates to ballistic resistance apparel such as vests which contain layers of fabric.

SUMMARY OF THE INVENTION

The present invention is a flexible impact resistant article comprising a plurality of prepreg packets. Each prepreg packet comprises at least about 2 prepreg layers. Each prepreg layer comprises a plurality of coplanar fibers embedded in a polymeric matrix. There is a means to maintain at least a portion of each prepreg packet in successive relative position. The prepreg packets are unattached to each other over a portion of their adjacent areas, preferably over a substantial portion of their adjacent areas. The plurality of packets results in improved flexibility.

The individual prepreg packets are preferably flexible in that each individual packets can easily bend. Such flexibility is indicated by a drape test and apparel applications as in a vest. In order to accomplish this the polymer matrix preferably has a tensile modulus measured according to ASTM D-638 at 25° C. of less than 6,000 psi. However, higher modulus matrices can be used and artical flexibility can be controlled by controlling the thickness of the prepreg packets.

In a preferred construction the prepreg packet comprises from 2 to 100 preferably, 2 to 50 most preferably 4 to 20 prepreg layers. The composite comprises from 2 to 50 prepreg packets. The total number of prepreg layers of the whole composite is at least 4, preferably from 4 to 150 prepreg layers and most preferably from 40 to 120 prepreg layers.

The fibers in the prepreg layers preferably have a tensile modulus of at least 160 grams/denier and preferably at least 500 grams/denier and an energy to break of at least 7 joules/gram and preferably at least 22 joules/gram.

It has been unexpectedly found that ballistic projectiles impacting the fabric at an oblique angle of incidence of greater than 30° to the normal resistance encounter less resistance than ballistic projectiles which hit the fabric perpendicular to the plane of the fabric. It is believed that the projectile can push aside individual fiber bundles to pass through the fabric.

The present invention is an improvement in flexible impact and preferably ballistic resistant, articles wherein the articles are made of a plurality of prepreg packets. It is found that not only does the article of the present invention have excellent resistance to ballistic impact normal to the surface of the composite but that it has significant improvement in resistance to impact of ballistic projectiles hitting the composite at an oblique angle.

DETAILED DESCRIPTION OF THE INVENTION

The present invention will be understood by those skilled in the art by reference to the accompanying Figures. The present invention is a flexible impact resistant article generally shown in FIGS. 1 and 2. The article comprises a plurality of prepreg packets 10. Each prepreg packet comprises at least about 2 prepreg layers 12. Each prepreg layer comprises a plurality of coplanar fibers 14 embedded in a polymer matrix 16.

Figure 1:
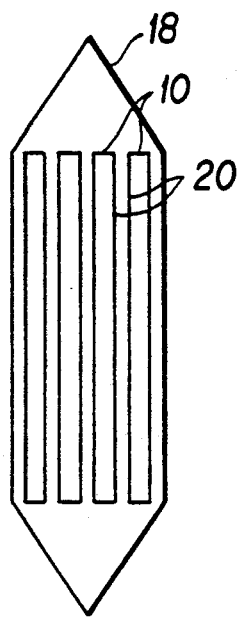
FIG. 1 is a cross-sectional side view of the ballistic resistant article of the present invention.
Figure 2:
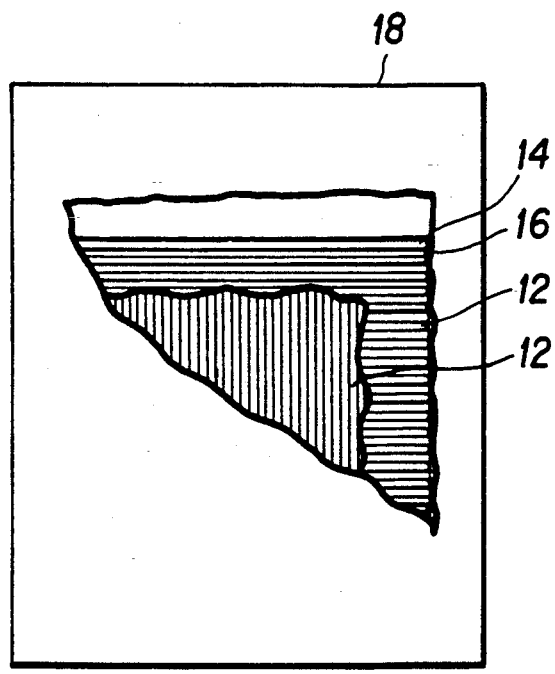
FIG. 2 is a front view of the article shown in FIG. 1 wherein a portion of the casing layer is broken open and the first two layers of the top prepreg packet are schematically illustrated.
Figure 3:
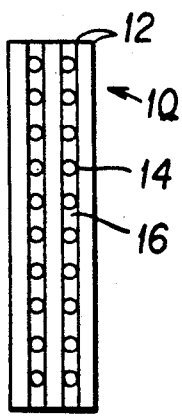
FIG. 3 shows a cross-sectional view of a prepreg packet.

There is a means to maintain at least a portion of each prepreg packet 10 in successive relative position as illustrated in FIG. 1. The prepreg packets are substantially unattached to each other over substantially their whole adjacent areas. In the preferred embodiment illustrated in FIGS. 1 and 2 the prepreg packets 10 are enveloped in a casing 18. The casing restricts the relative movement of adjacent prepreg packets 10 so that adjacent surfaces 20 of adjacent prepreg packets remain substantially opposite each other upon flexing. It is particularly preferred that the adjacent packets not be attached to enable the adjacent prepreg packets to slide relatively short distances within the means to maintain them in their relative positions. This allows for greater flexibility of the group of packets 10 as a whole. However, the plurality of prepreg packets can be attached by suitable means such as strapping, buttons, or being sewn along lengths or at points along the plurality of packets. There is preferably relative movement of at least a portion of adjacent prepregs.

The impact resistant article of the present invention is designed to have flexibility so that it could be used in impact resistant and particularly ballistic resistant apparel such as vests, pant inserts, coat inserts, lapels, or the like. The apparel should have compartments such as pockets in which the prepreg packets are located. Preferably, the packets are removable.

The use of the prepreg packets and the plurality of packets results in excellent resistance to ballistic projectiles in a direction normal to the surface of the fabric as well as impact from projectiles which strike the article obliquely to the surface of the fabric. This improved resistance to oblique impact is believed to be as a result of the use of composite packets.

The article to the present invention must resist ballistic projectiles and at the same time attain the desired flexibility. The flexibility of each packet is measured by a drape test. The flexibility of the article can be measured by the procedure of the Examples. The deflection of the composite used to make the article is at least 2 cm at the point of load, under a weight of 720 grams where the weight applied seven inches from the support point of the article and where the composite is built to an areal density of 4.85 kg/m. Each packet can bend with body movement or to contour along desired shapes. It has been found that flexibility can be attained where the article is made of a plurality of the flexible composite packets. The flexibility of the plurality of packets is enhanced by maintaining the packets adjacent to one another in successive layers where the packets are substantially unattached to each other over substantial adjacent areas.

In the most preferred embodiment as shown in FIG. 1 the adjacent packets 10 are not attached. They are held in place by a suitable casing 18. This enables the article to be flexible as a result of the flexibility packets and further as a result of the ability of the adjacent surfaces 20 of adjacent packets to slide relative to one another during flexing of the article. Adjacent surfaces 20 should always have at least a sufficient part of their surface juxtiposed to one another so that the packets can slide back into their original place. Successive packets should remain substantially overlapping in order to maintain a sufficient thickness for ballistic resistance.

A preferred prepreg layer of the present invention comprises an array of at least two adjacent coplanar, fibrous elements. Each element comprises a plurality of unidirectional fibers embedded in a polymer matrix. The fibers in each element are from 1 to 8 and preferably 2 to 6 inches long. The adjacent coplanar elements are connected through a polymer matrix.

A preferred prepreg packet of the present invention is multilayer composite comprising a plurality of the prepeg layers. The fibers of adjacent layers are at an angle of from 45° to 90°, preferably 60° to 90°, more preferably 80° to 90°, and most preferably at an angle of about 90° from each other. Element boundaries in alternate layers are preferably offset from each others. This results in an avoidance of weakness at the boundary points. The prepreg packet comprises 2 to 100, preferably 2 to 50, most preferably 4 to 20 prepreg layers. The multilayer composites contain 2 to 50 packets. The total composite has at least 4 layers, preferably from 4 to 500, and more preferably 10 to 120, 60 to 120 prepeg layers. The composite is useful to form planar flexible armor and can be formed to three dimensional articles.

The composite articles of the present invention has improved impact resistance. The composite articles preferably comprise high strength fibers having a tensile modulus of at least about 160 grams/denier and preferably at least about 500 grams/denier and a tenacity of at least about 7 grams/denier and preferably at least 22 grams/denier in a polymer matrix which is preferably an elastomeric matrix having a tensile modulus of less than about 20,000 psi, and preferably less than 6000 psi (measured at according to ASTM D63884 at 25° C.).

For the purposes of the present invention, fiber is an elongated body, the length dimension of which is much greater than the transverse dimensions of width and thickness. Accordingly, the term fiber includes monofilament fiber, multifilament fiber, ribbon, strip, a plurality of any one of combinations thereof and the like having regular or irregular cross-section.

Depending on the application for use of the prepreg layer in the multilayer composite of the present invention different fibers and different matrices can be used. Useful fibers include polyolefin based polymers and particularly ultra high molecular weight polyolefin fibers including polethylene and polypropylene fibers. Other useful high strength fibers include aramid fibers, polyvinyl alcohol fibers and other high strength fibers. Also useful in the present invention are a variety of conventional fibers which would result in improvement in resistance to impact properties when used in accordance with the present invention. Such fibers include but are not limited to asbestos, carbon, graphite, boron, cellulose, alumina, and metal fibers.

Fiber useful in the present invention include hightly oriented ultra-high molecular weight polyethylene fiber, highly oriented ultra-high molecular weight polypropylene fiber, aramid fiber, polyvinyl alcohol fiber or combinations thereof. U.S. Pat. No. 4,457,985 generally discusses such oriented ultra high molecular weight polyethylene and polypropylene fibers, and disclosure of which is hereby incorporated by reference to the extent not inconsistent herewith. In the case of polyethylene, suitable fibers are those highly oriented fibers of weight average molecular weight of at least about 200,000, preferably at least 500,000, more preferably at least about one million and most preferably between about two million and about five million. Known as extended chain polyethylene (ECPE) fibers, such fibers may be produced from polyethylene solution spinning processes described for example, in U.S. Pat. No. 4,137,394 to Meihuzen et al. or U.S. Pat. No. 4,356,138 to Kavesh et al., or spun from a solution to form a gel structure as described in German Off. No. 3,044,699, GB No. 2051667, and especially as described in U.S. Pat. No. 4,413,110.

As used herein, the term polyethylene shall mean a predominantly linear polyethylene material that may contain minor amounts of chain branching or comonomers not exceeding 5 modifying units per 100 main chain carbon atoms and that may also contain admixed therewith up to about 25 wt % of one or more polymeric additives such as alkene-1-polymers, in particular low density polyethylene, polypropylene or polybutylene, copolymers containing mono-olefins as primary monomers, oxidized polyolfins, graft polyolefin copolymers and polyoxymethylenes, or low molecular weight additives such as anti-oxidants, lubricants, ultra-violet screening agents, colorants and the like which are commonly incorporated therewith. Depending upon the fiber forming technique, the draw ratio and temperatures, and other conditions, a variety of properties can be imparted to these fibers. The tenacity of the fibers is ordinarily at least about 15 grams/denier, preferably at least about 25 grams/denier and most preferably at least about 30 grams/denier. Similarly, the tensile modulus of the fibers, as measured by an Instron tensile testing machine, is ordinarily at least about 300 grams/denier, preferably at least about 500 grams/denier, more preferably at least about 1,000 grams/denier and most preferably at least about 1,500 grams/denier. These highest values for tensile modulus and tenacity are generally obtainable only by employing solution spun or gel fiber processes. In addition, many ECPE fibers have melting points higher than the melting point of the polymer from which they were formed. Thus, for example, whereas ultra-high molecular weight polyethylenes of 500,000, one million and two million generally have melting points in the bulk of 138° C., the extended chain polyethylene (ECPE) fibers made of these materials have melting points 7° to 13° C. higher. The increase in melting point reflect a higher crystalline orientation of the fibers as compared to the bulk polymer. Notwithstanding the contrary teachings in the prior art improved ballistic resistant articles are formed when polyethylene fibers having a weight average molecular weight of at least about 200,000, preferably at least about 500,000, a modulus of at least about 500 g/denier and a tenacity of at least about 15 grams/denier are employed. c.f. John V. E. Hansen and Roy C. Liable in "Flexible Body Armor Materials," Fiber Frontiers ACS Conference, Jun. 10-12, 1974 (ballistically resistent high strength fibers must exhibit high melting point and high resistance to cutting or shearing); Roy C. Liable, Ballistic Materials and Penetration Mechanics, 1980 (noting that nylon and polyester may be limited in their ballistic effectiveness due to the lower melting point); and "The Application of High Modulus Fibers to Ballistic Protection", R. C. Liable, et al., J. Macromol. Sci. Chem., A7(1), pp. 295-322, 1973 (the importance of a high degree of heat resistance is again discussed).

In the case of polypropylene, highly oriented polypropylene fibers of weight average molecular weight at least about 300,000, preferably 750,000, more preferably at least about one million and most preferably at least about two million may be used. Ultra high molecular weight polypropylene may be formed into reasonably highly oriented fibers by the techniques prescribed in the various references referred to above, and especially by the technique of U.S. Pat. No. 4,413,110. Since polypropylene is a much less crystalline material than polyethylene and contains pendant methyl groups, tenacity values achievable with polypropylene are generally substantially lower than the corresponding values for polyethylene. Accordingly, a suitable tenacity is at least about 8 grams/denier, with a preferred tenacity being at least about 11 grams/denier. The tensile modulus for polypropylene is at least about 160 grams/denier preferably at least about 200 grams/denier. The melting point of the polypropylene is generally raised several degrees by the orientation process, such that the polypropylene fiber preferably has a main melting point of at least about 168° C., more preferably at least about 170° C. Employing fibers having a weight average molecular weight of at least about 750,000 coupled with the preferred ranges for the above-described parameters (modulus and tenacity) can provide advantageously improved performance in the final article especially in ballistic resistant articles, nothwithstanding the contrary teachings in the prior art). c.f. Liable, Ballistic Materials and Penetration Mechanics, supra, at p. 81 (no successful treatment has been developed to bring the ballistic resistance of polypropylene up to levels predicted from the yarn stress-strain properties); and in NTIS publication ADA018 958, "New Materials in Construction for Improved Helmets", A. L. Alesi et al. wherein a multilayer highly oriented polypropylene film material (without matrix), referred to as "XP", was evaluated against an aramid fiber (with a phenolic/-polyvinyl butyral resin matrix); the aramid system was judged to have the most promising combination of superior performance and a minimum of problems of combat helmet development.

Aramid fiber is formed principally from the aromatic polyamide. Aromatic polyamide fibers having a modulus of at least about 400 grams/denier and tenacity of at least about 18 grams/denier are useful for incorporation into composites of this invention. For example, poly(phenylenediamine terphalamide) fibers produced commercially by Dupont Corporation under the trade name of Kevlar ® 29 and 49 and having moderately high moduli and tenacity values are particularly useful in forming ballistic resistant composites. (Kevlar ® 29 has 500 grams/denier and 22 grams/denier and Kevlar ® 49 has 1000 grams/denier and 22 grams/denier as values of modulus and tenacity, respectively).

Polyvinyl alcohol (PV-OH), fibers having a weight average molecular weight of at least about 200,000, preferably at least about 550,000, more preferably between about 1,000,000 and about 4,000,000 and most preferably between about 1,500,000 and about 2,500,000 may be employed in the present invention. Usable fibers should have a modulus of at least about 160 grams/denier, preferably at least about 200 grams/denier, more preferably at least about 300 grams/denier, and a tenacity of at least about 7 grams/denier, preferably at least about 10 grams/denier and most preferably at least 17 grams/denier. PV-OH fibers having a weight average molecular weight of at least about 500,000, a tenacity of at least about 200 grams/denier and a modulus of at least about 10 grams/denier are particularly useful in producing ballistic resistant composites. PV-OH fibers having such properties can be produced, for example, by the process disclosed in U.S. Pat. No. 4,599,267 to Kwon et al.

The fibers may be precoated with a polymeric material preferably an elastomer based material prior to being arranged as described above. The low modulus elastomeric material has a tensile modulus, measured at about 23° C., of less than about 20,000 and preferably less than 6,000 psi (41,400 kPa). Preferably, the tensile modulus of the elastomer is less than about 5,000 psi (34,500 kPa), and most preferably is less than about 2,500 (17,250 kPa) to provide even more improved performance. The glass transition temperature (Tg) of the elastomer (as evidenced by a sudden drop in the ductility and elasticity of the material) should be less than about 0° C. Preferably, the Tg of the elastomer is less than about −40° C., and more preferably is less than about −50° C. The elastomer should have an elongation to break of at least about 50%. Preferably, the elongation to break is at least about 100%, and more preferably, it is about 300% for more superior performance.

A wide variety of elastomeric materials and formulations may be utilized in this invention. Representative examples of suitable elastomers have their structures, properties, and formulations together with crosslinking procedures summarized in the Encyclopedia of Polymer Science, Vol. 5, "Elastomers-Synthetic" (John Wiley & Sons Inc., 1964). The matrix materials of this invention preferably have low moduli as noted above. For example, any of the following materials may be employed: polybutadiene, polyisoprene, natural rubber, ethylene-propylene copolymers, ethylenepropylene-diene terpolymers, polysulfide polymers, polyurethane elastomers, chlorosulfonated polyethylene, polychloroprene, plasticized polyvinylchloride using dioctyl phthalate or other plasticers well known in the art, butadiene acrylonitrile elastomers, poly(isobutylene-co-isoprene), polyacrylates, polyesters, polyethers, fluorelastomers silicone elastomers, thermoplastic elastomers, copolymers of ethylene.

Particularly useful are block copolymers of conjugated dienes and vinyl aromatic monomers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A-B-A, multi-block copolymers of the type (AB)n(n=2–10) or radial configuration copolymers of the type $R-(BA) \times (x=30-150)$; wherein A is a block from a polyvinyl aromatic monomer and B is a block from a conjugated diene elastomer. Useful polymers are produced commercially by the Shell Chemical Co. and described in the bulletin "Kraton Thermoplastic Rubber", SC-68-81.

The low modulus elastomeric material may be compounded with fillers such as carbon black, silica, glass microballoons, etc. up to an amount not to exceed about 300% by weight of elastomer, preferably not to exceed about 100% by weight and may be extended with oils and vulcanized by sulfur, peroxide, metal oxide or radiation cure systems using methods well known to rubber technologists of ordinary skill. Blends of different elastomeric materials may be used together or one or more elastomer materials may be blended with one or more thermoplastics. High density, low density, and linear low density polyethylene may be cross-linked to obtain a material of appropriate properties, either alone or as blends. The modulus of such modified compound refers to the total matrix composition.

The proportion of coating on the coated fibers or fabrics may vary from relatively small amounts (e.g. 1% by weight of fibers) to relatively large amounts (e.g. 150% by weight of fibers), depending upon whether the coating material has impact or ballistic-resistant properties, and upon the rigidity, shape, heat resistance, wear resistance, flammability resistance and other properties desired for the composite article. In general, ballistic-resistant articles of the present invention containing coated fibers should have a relatively minor proportion of coating since the ballistic-resistant properties are almost entirely attributable to the fiber. Nevertheless, coated fibers with higher coating contents may be employed. Useful amounts of coating, based upon the weight of the fiber range from 5 to 100, preferably 10 to 50, and most preferably 10 to 30 percent.

The coating may be applied to the fiber in a variety of ways. One method is to apply the resin of the coating material to the stretched high modulus fibers either as a liquid, a sticky solid or particles in suspension, or as a fluidized bed. Alternatively, the coating may be applied as a solution or emulsion in a suitable solvent which does not adversely affect the properties of the fiber at the temperature of application. While any liquid capable of dissolving or dispersing the coating polymer may be used, preferred groups of solvents include water, paraffin oils, ketones, alcohols, aromatic solvents or hydrocarbon solvents or mixtures thereof, with illustrative specific solvents including paraffin oil, xylene, toluene and octane. The techniques used to dissolve or disperse the coating polymers in the solvents will be those conventionally used for the coating of similar elastomeric materials on a variety of substrates.

Other techniques for applying the coating to the fibers may be used, including coating of the high modulus precursor before the high temperature stretching operation, either before or after removal of the solvent from the fiber. The fiber may then be stretched at elevated temperatures to produce the coated fibers. The extruded gel fiber may be passed through a solution of the appropriate coating polymer (solvent may be paraffin oil, aromatic or aliphatic solvent) under conditions to attain the desired coating. Crystallization of the high molecular weight polyethylene in the gel fiber may or may not have taken place before the fiber passes into the cooling solution. Alternatively, the fiber may be extruded into a fluidized bed of the appropriate polymeric powder.

The fiber used in the present invention, as indicated above can be monofilament fiber, multifilament fiber, ribbons, strip or combinations thereof. The fiber can have regular or irregular cross-section. The fiber can be in the form of a monofilament or multifilament yarn. It can be twisted or untwisted.

The fibers in the fibrous elements used to form the prepreg layers of the present invention are preferably arranged unidirectionally in that each fiber is parallel to an adjacent fiber. The fibrous web is impregnated with a polymeric material to form the prepreg layer. The fibers in the prepreg layers can be continuous.

The prepreg layer can be cut so that the longest continuous fiber in the layer is from 1 to 8 and preferably 2 to 6 inches in length. Each prepreg layer comprises an array of at least two adjacent coplanar fibrous elements.

The fibers of adjacent layers are at an angle of from 45° to 90°, preferably 60° to 80°, and more preferably 80° to 90°, and most preferably at an angle of about 90° from the fiber and the adjacent layers.

Figure 7:
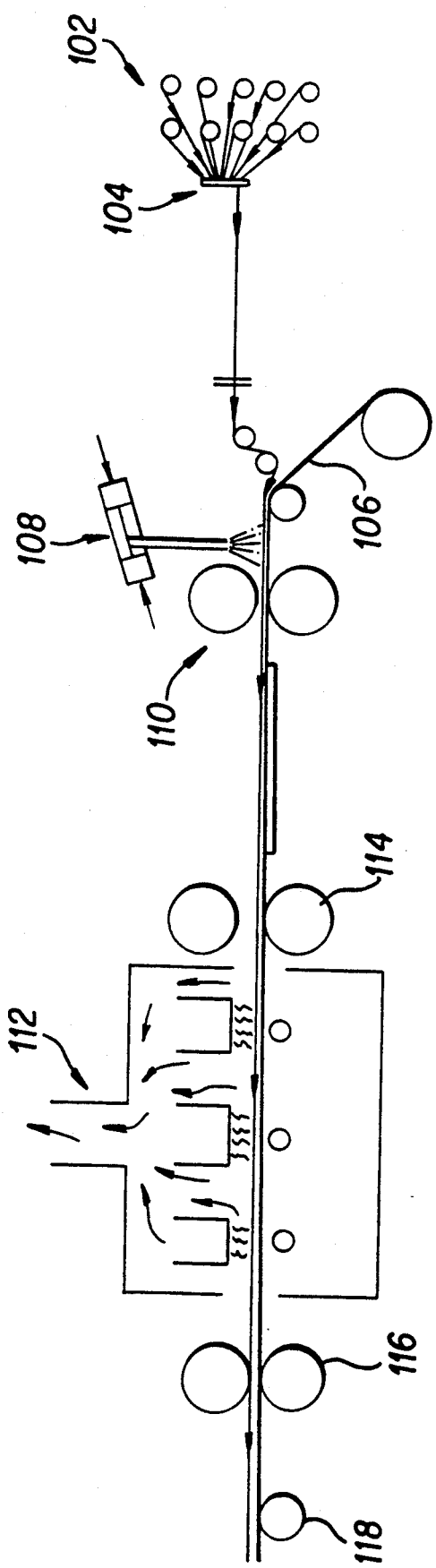
FIG. 7 is a schematic view of a process to make elements useful for prepreg layers of the present invention.

FIG. 7 illustrates a schematic view of a process to make the elements useful for prepreg layers of the present invention. This typical process illustrates forming the prepreg from multifilament yarn and impregnating these fibers with matrix resin. The process generally comprises the steps of bringing the yarn in sheet form onto a carrier web and bringing the yarn laid in the unidirectional sheet form into contact with the matrix resin. The matrix resin can te in the form of solution, emulsion or melt. The next step is to consolidate the resin impregnated sheet. This can be accomplished by drying to remove the solvent or cooling to solidify the melt. The prepreg sheet is then rolled up and cut for use in accordance with the present invention.

A plurality of yarn is supplied from a creels 102 and passed through a combing stations 104. The combed yarn is then placed on a carrier web which can be a paper or film substrate 106. A polymer resin is applied to the yarn layer at 108. The coated yarn is then passed through a pair of rollers 110. The rollers spread the resin uniformly among the filaments of yarn. The impregnated yarn layer is then passed through a heated oven 112 for drying. Nip rollers 114 is used to control final layer thickness. Nip roller 116 is used to pull the carrier web and prepreg through the system. The substrate and the prepreg are wound on roller 118. The prepreg layer can then be cut into suitable elements to make the prepreg layers of the present invention.

Suitable matrix materials include polyethylenes, cross-linked polyethylenes, polypropylenes, ethylene copolymers, propylene copolymers and other olefin polymers and copolymers. Examples of such other matrix materials include unsaturated polyesters, phenolics, polybutyrals, epoxy resins and polyurethane resins and other low modulus resins curable below the melting point of the fiber.

The proportion of matrix to fiber is variable for the composites, with matrix material amounts of from about 5% to about 150%, by weight of fibers, representing the broad general range. Within this range, it is preferred to use composites having a relatively high fiber content, such as composites having only 10-50% matrix material, by weight of fibers, and more preferably 10-30% matrix material.

Stated another way, the fiber network occupies different proportions of the total volume of the composite. Preferably, however, the fiber network comprises at least about 30 volume percent of the composite. For ballistic protection, the fiber network comprises at least about 50 volume percent, and most preferably at least about 70 volume percent, with the matrix occupying the remaining volume.

Composites made using the prepreg layer are made using the above-described fibrous elements. A preferred way to make the prepregs is to lay-up individual layers and heat them and form them into the desired configuration. Suitable means include compression molding, stamping, or heating under pressure within an autoclave.

One technique for forming a composite includes the steps of arranging prepreg sheet into a desired element structure. The prepreg layers are then made into a composite by laying up the prepreg layers. The composite is then heated under pressure to cause the matrix material to flow and occupy any void spaces. In the above cases, it is possible that the matrix can be caused to stick or flow without completely melting. In general, if the matrix material is caused to melt, relatively little pressure is required to form the composite; while if the matrix material is only heated to a sticking point, generally more pressure is required. Also, the pressure and time to set the composite and to achieve optimal properties will generally depend on the nature of the matrix material (chemical composition as well as molecular weight) and processing temperature.

The prepreg layers of the present invention typically contain from 5 to 30 fiber ends per inch and preferably 10 to 20 per inch. Each layer is typically from 0.0001 to 0.015, preferably 0.0005 to 0.01, more preferably 0.0005 to 0.005, and most preferably 0.0005 to 0.0025 inches thick. Layers having these dimensions are particularly useful when made of extended chain polyethylene having a yarn denier of about 1200 denier/118 filaments. The areal density is used to indicate the amount of fiber and/or resin per unit area of the prepreg layer. It is determined by the number of yarn strands laid per unit width of prepreg sheet and the amount of resin applied to the yarn. Typically if a 1200 denier/118 filament yarn is laid by 15 ends per inch the yarn aerial density in the prepreg sheet would be about 79 grams per square meter.

The prepreg layer of the present invention is preferably stacked in a 0°/90° sequence. However, sequences of alternating layers of 0/45/90/135 or 0/60/120/180 can be used. While 0/0/90/90 repeating units can be used, they are not preferred.

The composites made can be molded in flat or three dimensional presses, stamped or molded in an autoclave. The main variables are pressure, time and temperature. Flat plaques can be molded between two plates of a molding press. The plates are heated to a controlled temperature. A molding press which has been used has a plate size of 2 feet by 2 feet and a molding pressure of up to 200 tons.

The following examples are presented to provide a more complete understanding of the invention, the specific techniques, conditions, materials, proportions and reported data set forth to illustrate the principles of the invention are examplory and should not be construed as to limiting the scope of the invention.

EXAMPLE 1

The prepreg packets of the present invention were prepared by consolidation of a plurality of sheets comprised of unidirectional, high strength, extended chain polyethylene (ECPE) yarn impregnated with a thermoplastic elastomer matrix.

The yarn was Spectra® 1000 produced by Allied Corp. and has a reported yarn tenacity of approximately 33 g/denier, a modulus of approximately 1250 g/denier, an energy-to-break of approximately 55 Joules/g, a yarn denier of approximately 650 and an individual filament density of approximately 5.5 (118 filaments, untwisted yarn).

The prepreg layers were made by feeding yarn from a creel to form a web of yarn about inches wide and having about 15 yarn ends per inch. The web of yarn was pulled from creels and coated with Kraton D-1107 which is a styrene-isoprene-styrene block copolymer (SIS) leaving about 14% by weight styrene. This material is sold by the Shell Chemical Company and is described in the bulletin *Kraton Thermoplastic Rubber, typical property guide Kraton D and Kraton G*. It is indicated to have the No. SC:68-81. The specific Kraton D resin used was Kraton D-1107 which is reported to have a glass transition temperature of −55° C. The polymer has a reported melt index of 9 g/10 min. at ASTM 1238 Condition G, and a Modulus tested using ASTM-D462 with a jaw separation speed of 10 in/min of 100 psi at 300% elongation.

The coating comprised a homogeneous solution of 6% Kraton D-1107 and about 94% by weight of methylene chloride. The yarn web was supported on a silicone coated release paper and was pulled through a pair of nip rolls with a gap setting of approximately 0.026 inches. The embedded yarn was passed through a gas fired hot air oven at an air temperature of 90° C. and the solvent evaporated. The resin impregnated sheet was wound with the release paper. The resin impregnated sheet was peeled from the release paper and measured to be approximately 8 inches wide and have a thickness of approximately 0.003 inches and an areal density of 64 g/m². The prepreg sheet contains 65% by weight of unidirectionally yarn and about 35% by weight of the Kraton D-1107.

In the molding procedure the prepreg was cut into square sheets having sides 15 inches in length. Ten squares were stacked together with the fiber length direction in each prepreg sheet perpendicular to the fiber length in adjacent sheets. A thin square of low density polyethylene film was placed over the top and under the bottom of the stacked prepreg sheets. Two Apollo plates (0.05 cm thick chrome coated steel plates) coated with general purpose mold release were used to sandwich the sample after a thermocouple probe was inserted approximately 2 cm from the corner of the sample between the two middle prepreg sheet layers. This cold assembly was placed between two platens of a hydraulic press and subjected to a temperature of approximately 130° C. and a pressure of approximately 30 tons. Five minutes after the thermocouple indicated a temperature of 120° C., water coolant was passed through the platen. Pressure was released when the sample temperature was less than 50° C. The low density polyethylene films and prepreg layers were consolidated to form a prepreg packet.

The areal density (AD) of the prepreg is an indication of fiber weight per area. The total areal density (ADT) of the prepreg is an indication of composite weight per area. For example, the ten prepreg packets above used in Table 1, Example 1 of the present invention had a fiber areal density of 0.0485 and a total areal density of 0.0693 kg/meter square. Panels were prepared 15 inches square.

Comparative testing was conducted using Kevlar ® ballistic fabric. Kevlar is a trademark for polyaramid fiber produced by the Dupont Co. The fabric is Clark-Schwebb Fiber Glass Corp. Style 713, which is a 31 x 31 end per inch plain weave using 1000 denier Kevlar ® 29. Clark-Schwebb uses this fabric to make bullet proof vests.

Testing was conducted by H. P. White Lab Inc. using varying numbers of prepreg packets. Testing was conducted with 0.44 magnum, 9 mm bullets and 22 caliber fragments. All shots were fired normal to the packet surface. Testing with bullets was done against a clay surface as described in the National Institute of Justice Standard NDJ Standard 0101.02. Testing using the .22 caliber fragments was done according to MIL SPEC MIL-P-46593A (ORD). The results were compared against panels using layers of the above-described polyaramid fabric. The results are summarized on Tables 1-3 below.

TABLE 1

RESULTS AGAINST .44 MAGNUM BULLETS

| No. of Packets | AD (kg/m²) | ADT (kg/m²) | V(s) (ft/sec.) | PENETRATION | INDENTATION (inches) |
|---|---|---|---|---|---|
| (A) SPECTRA 1000 COMPOSITE | | | | | |
| 10 | 4.85 | 6.93 | 1429 | NO | 1.4 |
| 9 | 4.37 | 6.24 | 1400 | NO | 1.6 |
| 8 | 3.88 | 5.54 | 1273 | NO | 1.7 |
|   |      |      | 1427 | NO | 2.1 |
| 7 | 3.40 | 4.85 | 1477 | NO | 2.3 |
| 6 | 2.91 | 4.16 | 1425 | YES | — |
| (B) KEVLAR BALLISTIC FABRIC | | | | | |
| No. of Layers | | | | | |
| 24 | 6.78 | 6.78 | 1458 | YES | — |
|    |      |      | 1431 | NO | 2.0 |

TABLE 2

RESULTS AGAINST 9MM BULLETS

| No. of Packets | AD (kg/m²) | ADT (kg/m²) | V(s) (ft/sec.) | PENETRATION | INDENTATION (inches) |
|---|---|---|---|---|---|
| (A) SPECTRA 1000 COMPOSITE | | | | | |
| 10 | 4.85 | 6.93 | 1404 | NO | 0.7 |
| 9 | 4.37 | 6.24 | 1427 | NO | 1.0 |
| 8 | 3.88 | 5.54 | 1385 | NO | 0.6 |
| 6 | 2.91 | 4.16 | 1404 | NO | 1.4 |
| 5 | 2.43 | 3.47 | 1439 | YES | — |
| 4 | 1.94 | 2.77 | 1440 | YES | — |
| (B) KEVLAR BALLISTIC FABRIC | | | | | |
| No. of Layers | | | | | |
| 24 | 6.78 | 6.78 | 1426 | NO | 1.0 |

TABLE 3

RESULTS AGAINST .22 CALIBER FRAGMENTS

| No. of Packets | AD (kg/m²) | ADT (kg/m²) | V(s) (ft/sec.) | SEA Jm²/kg | SEAT Jm²/kg |
|---|---|---|---|---|---|
| (A) SPECTRA 1000 COMPOSITE | | | | | |
| 9 | 4.37 | 6.24 | 1930 | 43.6 | 30.5 |
| (B) Kevlar Fabric | | | | | |
| No. of Layers | | | | | |
| 23 | 6.2 | 6.2 | 1850 | 28.2 | 28.2 |

The nonwoven flexible panels of the present invention are much less bulky than the traditional panels made of multiple layers of woven Kevlar fabric. The results indicate that the panels made of multiple packets of the present invention had equivalent ballistic resistance to polyaramid fiber. In particular resistance to 44 magnum bullets was equivalent to the polyaramid at 70% of the weight of the polyaramid and 54% of the polyaramid thickness. Resistance to 9 mm bullets was equivalent when using the panels of the present invention set 60% of the polyaramid and 46% of the thickness.

Ballistic performance of the flexible packets of the present invention is superior to the polyaramid fiber when compared on a fiber weight basis, and superior when compared to total weight basis.

EXAMPLE 2

This illustrates the improved ballistic resistance at oblique angles. The polyethylene packets and polyaramide fiber were identical to those used in Example 1. Testing was done as in Example 1 using 9 mm bullets except that the angle of impact to the surface in Example 1 was 0° which is normal to the surface. In this Example testing was done at 0°, 30°, 45° and 60° from the normal. The number of packets necessary to stop 9 mm bullets traveling at 1090 feet per second was established. This corresponds to Threat Level 2A of National Institute of Justice (NIJA) Standard 01.03 and represents a common handgun hazard. "C" is complete penetration and "P" stands for partial penetration.

Results are summarized on Tables 4, 4[1] and 5, 5[1] below. Table 4 is a summary of results of ballistic testing against 9 mm bullets. Table 4[1] illustrates the areal density required for protection using Spectra ® packets.

TABLE 4

| | | SPECTRA 1000 | | | | |
|---|---|---|---|---|---|---|
| No. of Packets | AD (Kg/m²) | ADT (Kg/m²) | IMPACT ANGLE | V/(S) (ft/sec) | C/P | INDENTATION (inches) |
| 3 | 1.46 | 1.94 | 0 | 1137 | C | |
| 4 | 2.08 | 2.77 | 0 | 1139 | P | 1.4 |
| 4 | 2.08 | 2.77 | 0 | 1128 | P | 1.2 |
| 3 | 1.46 | 1.94 | 30 | 1101 | C | |
| 4 | 2.08 | 2.77 | 30 | 1106 | P | 1.05 |
| 3 | 1.46 | 1.94 | 45 | 1109 | C | |
| 4 | 2.08 | 2.77 | 45 | 1112 | P | 0.9 |
| 4 | 2.08 | 2.77 | 60 | 1107 | P | 0.75 |
| 3 | 1.46 | 1.94 | 60 | 1113 | P | 0.9 |
| 3 | 1.46 | 1.94 | 60 | 1066 | P | 0.9 |
| 2 | 1.04 | 1.38 | 60 | 1147 | C | |
| 2 | 1.04 | 1.38 | 60 | 1133 | C | |

TABLE 4[1]

| | SPECTRA 1000 | |
|---|---|---|
| No. of Packets | Impact Angle | ADT for Protection |
| 4 | 0 | 2.77 |
| 4 | 30 | 2.77 |
| 4 | 45 | 2.77 |
| 3 | 60 | 1.94 |

TABLE 5

| | | KEVLAR FABRIC | | | |
|---|---|---|---|---|---|
| No. of Fabric Layers | AD (kg/m²) | IMPACT ANGLE | V/S (ft/sec) | C/P | IDENTATION (inches) |
| 12 | 3.24 | 0 | 1112 | P | 1.3 |
| 12 | 3.24 | 0 | 1107 | P | 1.3 |
| 10 | 2.70 | 0 | 1128 | C | |
| 10 | 2.70 | 0 | 1110 | C | |
| 14 | 3.78 | 30 | 1107 | P | 1.1 |
| 14 | 3.78 | 30 | 1127 | C | |
| 14 | 3.78 | 45 | 1102 | C | |
| 14 | 3.78 | 45 | 1117 | P | 0.9 |
| 14 | 3.78 | 45 | 1120 | P | 0.8 |
| 18 | 4.86 | 60 | 1133 | P | 0.7 |
| 18 | 4.86 | 60 | 1111 | C | |
| 20 | 5.40 | 60 | 1118 | P | 0.7 |
| 20 | 5.40 | 60 | 1126 | C | |
| 22 | 5.94 | 60 | 1128 | P | 0.7 |
| 22 | 5.94 | 60 | 1101 | P | 0.7 |

TABLE 5[1]

| | KEVLAR FABRIC | |
|---|---|---|
| No. of Fabric Layers | IMPACT ANGLE | ADT for Protection |
| 12 | 0 | 3.24 |
| 14 | 30 | 3.79 |
| 16 | 45 | 4.33 |
| 22 | 60 | 5.95 |

Figure 4:
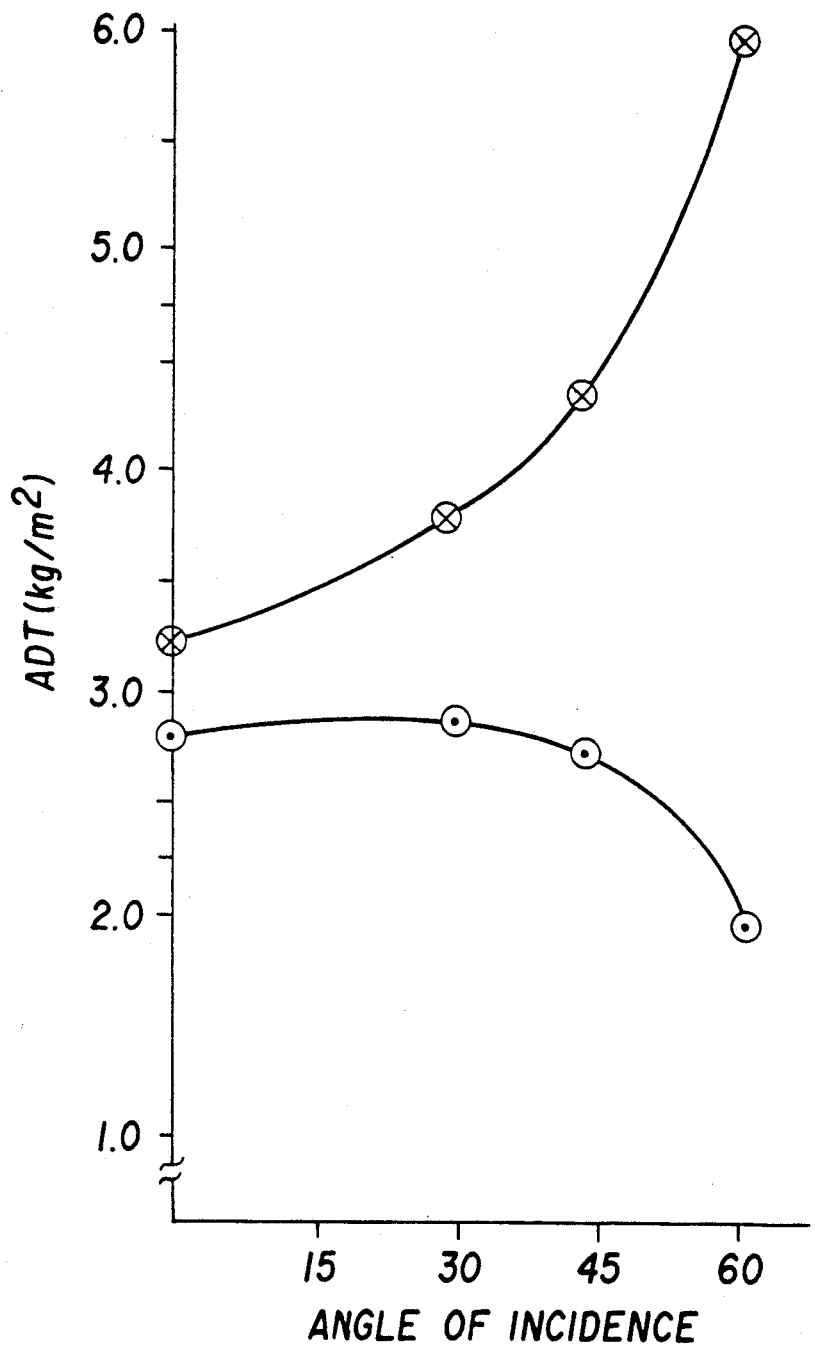
FIG. 4 is a graph of areal density of the composite (ADT) versus the angle of incidence at which a 9 mm bullet is stopped as indicated in Example 2 below.

The results shown on FIG. 4, show that while the ballistic resistance of convential commercial ballistic resistant polyarmid fabric decreases with the angle of incidence of the shot, so that a greater ADT and therefore more layers are required, the resistance of the composite of the present invention actually increases requiring a lower ADT.

A stack of 10 prepreg packets, identical to those used to establish the ballistic performance Example 1 and having sides 9.5 inches (24.1 cm) long, was placed under a wooden bar with the outer packet edge parallel to the table edge. The ten panels together have an AD of about 4.85 kg/m². The ten panels were clamped with C-clamps to a table with 7 inches (17.8 cm) hanging unsupported by the table top. A weight of 720 grams was hung from the center of the unsupported side, (opposite the supported side) causing the stack of panels to deflect 2.25 inches (5.7 cm). This experiment was repeated using a single panel made of 125 prepreg layers having an AD of 4.1 kg/m², and a Kraton D1107 matrix. Deflection was measured to be approximately 0.125 inches (0.32 cm).

Figure 5:
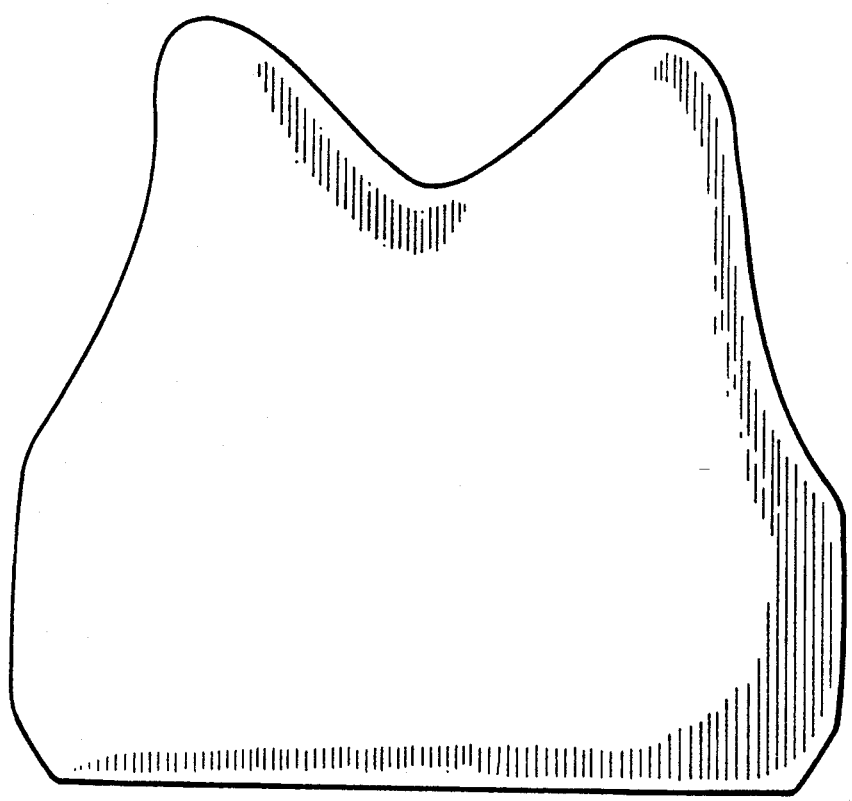
FIGS. 5 and 6 are packet layers for front and back layers of prepreg packets of the present invention for bullet proof vests.
Figure 6:
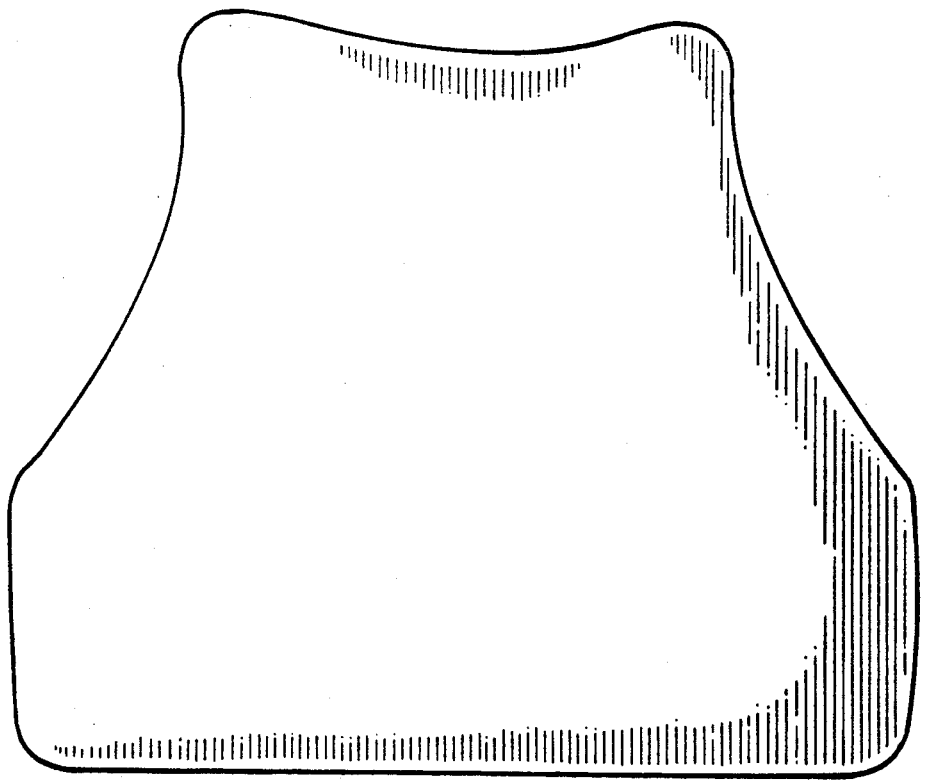

A ballistic vest was prepared from seven prepreg packets, 24 inches (61 cm) square by cutting them to the general shapes in FIGS. 5 and 6. This shape has been used in commercial available vests using Kevler fabric sold by the Barrday Division of Allied Signal Corp. The prepreg packets are inserted into thin cotton packets. This vest was worn by a number of individuals and was judged to be equivalent or superior in comfort to that the Kevler insert designed for these vests.

While examplary embodiments of the invention have been described, the true scope of the invention is to be determined from the following claims.

We claim:

1. A flexible impact resistant article comprising a plurality of prepreg packets having adjacent surfaces, where each prepreg packet comprises a composite comprising at least 4 prepreg layers, with each prepreg layer comprising an array of at least two adjacent coplanar fibrous elements, each element comprising a plurality of unidirectional fibers embedded in a polymeric matrix wherein the unidirectional fibers of adjacent layers are arranged at approximately 90° to the fibers in the next layer and are up to eight inches in length, the adjacent elements being connected by the polymeric matrix, and a means to maintain at least a portion of adjacent prepreg packets in successive relative position, the prepreg packets being unattached to each other over a portion of their adjacent surfaces.

2. The article as recited in claim 1 wherein the fibers in the prepreg layers are from about two to about six inches long.

3. The article as recited in claim 1 wherein the fibers in the prepreg layers have a tensile modulus of at least about 160 g/denier and an energy to break of at least 7 J/g.

4. The composite as recited in claim 1 wherein there are from 3 to 500 prepreg layers.

5. The article as recited in claim 3 wherein there are from 60 to 120 layers.

6. The article as recited in claim 1 wherein each prepreg packet comprises from 5 to 20 prepreg layers.

7. The article as recited in claim 1 wherein the composite comprises from 2 to 500 prepreg packets.

8. The article as recited in claim 1 wherein the fiber is selected from the group consisting of polyolefins, polyvinylalcohol, polyaramid and combinations thereof.

9. The article as recited in claim 1 wherein the polymer matrix has a tensile modulus of less than 6000 psi at 25° C.

10. The article as recited in claim 1 wherein each prepreg packet comprises at least 10 prepreg layers.

11. The article as recited in claim 1 wherein each prepreg packet comprises 4 to 100 prepreg layers.

12. The article as recited in claim 1 wherein each prepreg packet comprises 10 to 100 prepreg layers.

13. The article as recited in claim 1 wherein the article is a vest.

14. A flexible impact resistant article comprising a plurality of prepreg packets having adjacent surfaces, where each prepreg packet comprises a composite comprising at least 2 prepreg layers, with each prepreg layer comprising an array of at least two adjacent coplanar fibrous elements, each element comprising a plurality of unidirectional fibers embedded in a polymeric matrix wherein the unidirectional fibers of adjacent layers are arranged at approximately 90° to the fibers in the next layer and are up to eight inches in length, the adjacent elements being connected by the polymeric matrix, and a means to maintain at least a portion of adjacent prepreg packets in successive relative position, the prepreg packets being unattached to each other over a portion of their adjacent surfaces.

* * * * *